United States Patent [19]

Brendzel

[11] Patent Number: 5,677,950
[45] Date of Patent: Oct. 14, 1997

[54] TELEPHONE WITH DIAL HISTORY ACCESS

[75] Inventor: Henry Tzvi Brendzel, Millburn, N.J.

[73] Assignee: Lucent Technologies Inc., Murray Hill, N.J.

[21] Appl. No.: 771,888

[22] Filed: Dec. 23, 1996

Related U.S. Application Data

[63] Continuation of Ser. No. 519,035, Aug. 24, 1995, abandoned.

[51] Int. Cl.⁶ ........................................ H04M 1/27
[52] U.S. Cl. .................. 379/355; 379/354; 379/356; 379/216
[58] Field of Search .................. 379/354, 355, 379/216, 201, 356, 209, 157

[56] References Cited

U.S. PATENT DOCUMENTS

| | | | |
|---|---|---|---|
| 4,475,013 | 10/1984 | Lee et al. | 379/355 |
| 4,709,387 | 11/1987 | Masuda | 379/356 |
| 4,930,155 | 5/1990 | Kurokawa | 379/355 |
| 5,136,637 | 8/1992 | Rust et al. | 379/355 |
| 5,267,308 | 11/1993 | Jokinen et al. | 379/355 |
| 5,491,745 | 2/1996 | Roeder | 379/355 |

*Primary Examiner*—Ahmad F. Matar
*Attorney, Agent, or Firm*—Steven R. Bartholomew; Henry T. Brendzel

[57] ABSTRACT

A telephone instrument with computing means and a memory that stores a number of dialed numbers. The computing means follows a process that is responsive to the "re-dial" button of the telephone instrument and to the "#" and "*" buttons on the dial pad. The process provides a "backup" capability that points to successively older entries in the memory, thereby allowing a user to dial out older entries, and also provides a search function that searches through the memory for a specified number.

11 Claims, 5 Drawing Sheets

TELEPHONE WITH DIAL HISTORY ACCESS

This application is a continuation of application Ser. No. 08/519,035, filed on Aug. 24, 1995 (now abandoned).

BACKGROUND OF THE INVENTION

A number of currently available telephones include a dedicated push button that permits re-dialing of the last-dialed number. The telephone instrument includes a memory that stores the last-dialed number, and that stored number is dialed out when the button is pressed.

On occasion, it is desirable to re-dial a number that had been dialed earlier than the last-dialed number, but currently available telephones do not provide this capability.

In a completely different field of art, in the UNIX® computer operating system the Korn shell includes a queue that stores previously entered commands. Those commands can be retrieved by pressing the escape key followed by the "k" key. Each time the "k" key is pressed, another command from the queue is presented on the computer screen. When the "ENTER" key is pressed, the command is executed. When a user wishes to search of a specific command that is already in the queue, the user presses the "/" key after pressing the escape key, and followed by some of the initial characters of the searched-for command.

SUMMARY

The desired re-dial capability is achieved by providing a telephone instrument with computing means and a memory that stores a number of dialed numbers. The computing means follows a process that is responsive to the "re-dial" button of the telephone instrument and to the "#" and "*" buttons on the dial pad. The process provides a "backup" capability that points to successively older entries in the memory, thereby allowing a user to dial out older entries, and also provides a search function that searches through the memory for a specified number.

DETAILED DESCRIPTION

Figure 1:
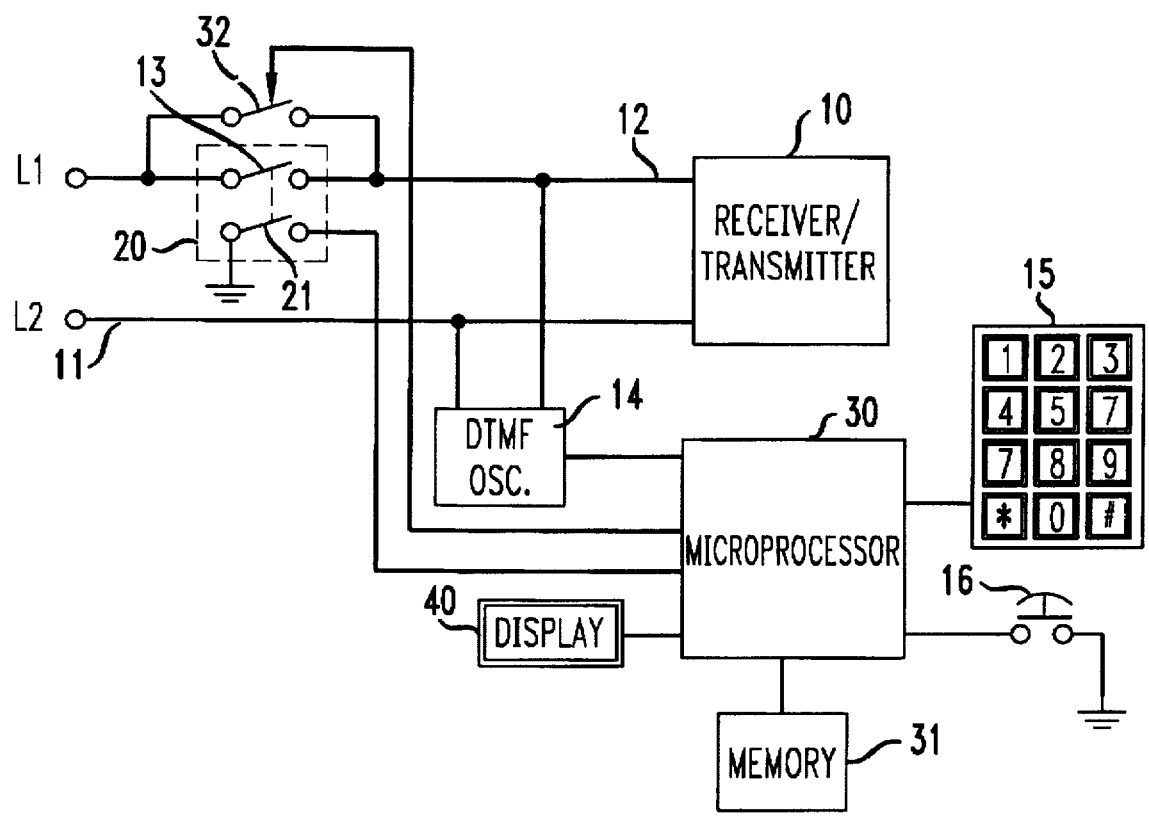
FIG. 1 is a block diagram of a telephone instrument that comports with the principles disclosed herein.

FIG. 1 is a schematic diagram of a telephone apparatus that embodies the principles disclosed herein. It contains a conventional telephone receiver/transmitter unit 10 with line 11 connected to terminal L2 directly and line 12 connected to terminal L1 through contacts 13 of hook switch 20. Lines 11 and 12 are also connected to conventional DTMF oscillator 14, and oscillator 14 is connected to microprocessor 30. Conventional dialing pad 15 and "backup" ("re-dial") button 16 are also connected to microprocessor 30, as is memory 31. Microprocessor 30 is also responsive to contracts 21 of hook switch 20, and controls display 40 and switch 32 which is connected across contacts 13.

Not all of the elements presented in FIG. 1 are essential, however. For example, the principles disclosed herein are applicable to telephone instruments that lack a visual display, or ones that lack switch 32. The latter can electronically place the phone in an "off hook" condition, which is a feature that sometimes is found in speakerphones.

Before describing the flow of processes carried out by the FIG. 1 apparatus, it is perhaps useful to present an overview of the capabilities achieved by the FIG. 1 apparatus when combined with the processes disclosed below.

First, the familiar mode of requesting a re-dial of the last number is to be maintained. That is, when button 16 is pressed (indicated by the letter B—for "Backup"—in the table below) and nothing more, the instrument should dial out the last number dialed. Second, reaching the next-previous number should be a simple, one button, operation. For convenience, the same B is selected to achieve this function. In another circumstance, the button "*" is used to indicate a repeat of an operation, so use of "*" also yields the next-previous number. Third, when B is followed by pressing one or more of the "0" through "9" buttons on the dial pad, it is assumed that a search is to be performed for a number that starts with the numbers pressed. Since B by itself represents a request for the last number dialed and B followed by something else represents some other request, a "wait and see" delay is injected before a response to B is effected.

The above is presented in greater detail in the table below.

| | |
|---|---|
| 5821000 | Normal dialing operation. |
| B | Dial out the last number dialed. |
| B* | The * indicates a desire to repeat. In this case, it is a repeat of case 1 above (B), which is a dialing out of the last number dialed. Hence, this case indicates the desire to dial the number dialed before the last number dialed. |
| BB | Same as above. |
| B** | A number of *s indicates a number of repeats —in this case 2 —, and that indicates a desire to dial the number dialed before the number indicated by B*. When the numbers dialed are kept in a stack, B points to the top of the stack, B* points to the number below the top of the stack, and B** points to the number below the number pointed to by B*. |
| B7 | indicates a desire to find the last number dialed that begins with the number following the B —in this example, 7. |
| B7# | The # indicates a desire to actually dial out the number found by the process preceding the # — in this case the number found by B7. |
| B74 | Adding a second digit — in this example, 4 — indicates that the user wishes to restart the search for a last dialed number that begins with the newly specified sequence of digits; i.e., 74. |
| 908B | User inserted digits that are not preceded by a B are dialed out in a conventional manner. When followed by B, the last number dialed is also dialed out. |

Figure 2:
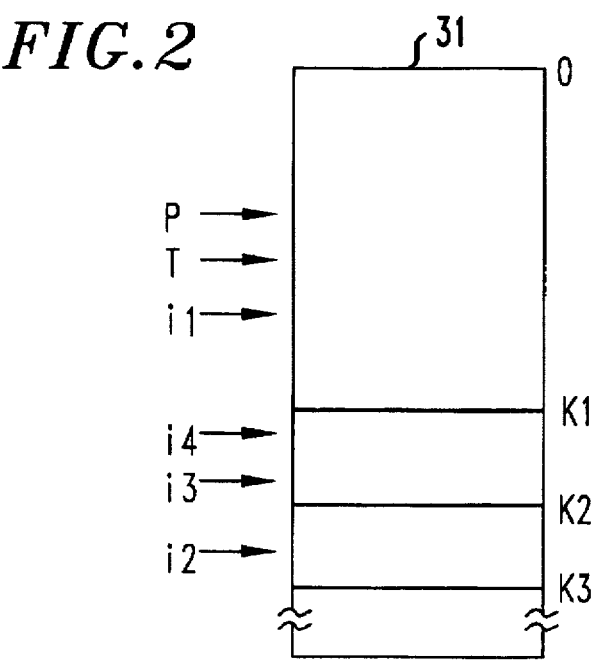
FIG. 2 presents an image of the storage segments in memory 31.

FIG. 2 presents an image of storage memory 31. The segment covered by addresses 0 through K1-1 stores the numbers that had been previously dialed out in the form of "stack". A stack is a last-in-first-out (LIFO) memory arrangement. Associated with this segment is a pointer T that points to the "top of the stack", a pointer P that points to a number that corresponds to a search result, and a search index i1. The second segment covers address K1 through K2-1 and it stores the digits entered by the user (for example, the digits "74", in the penultimate case in the table above). Associated with this segment is a storage index i3 and a search index i4. The third segment covers addresses K2 through K3-1 and it stores the number last dialed out in consequence of the current call, whether dialed by the user or by the process of using the backup button. Associated with this segment is an index i2.

Figure 3:
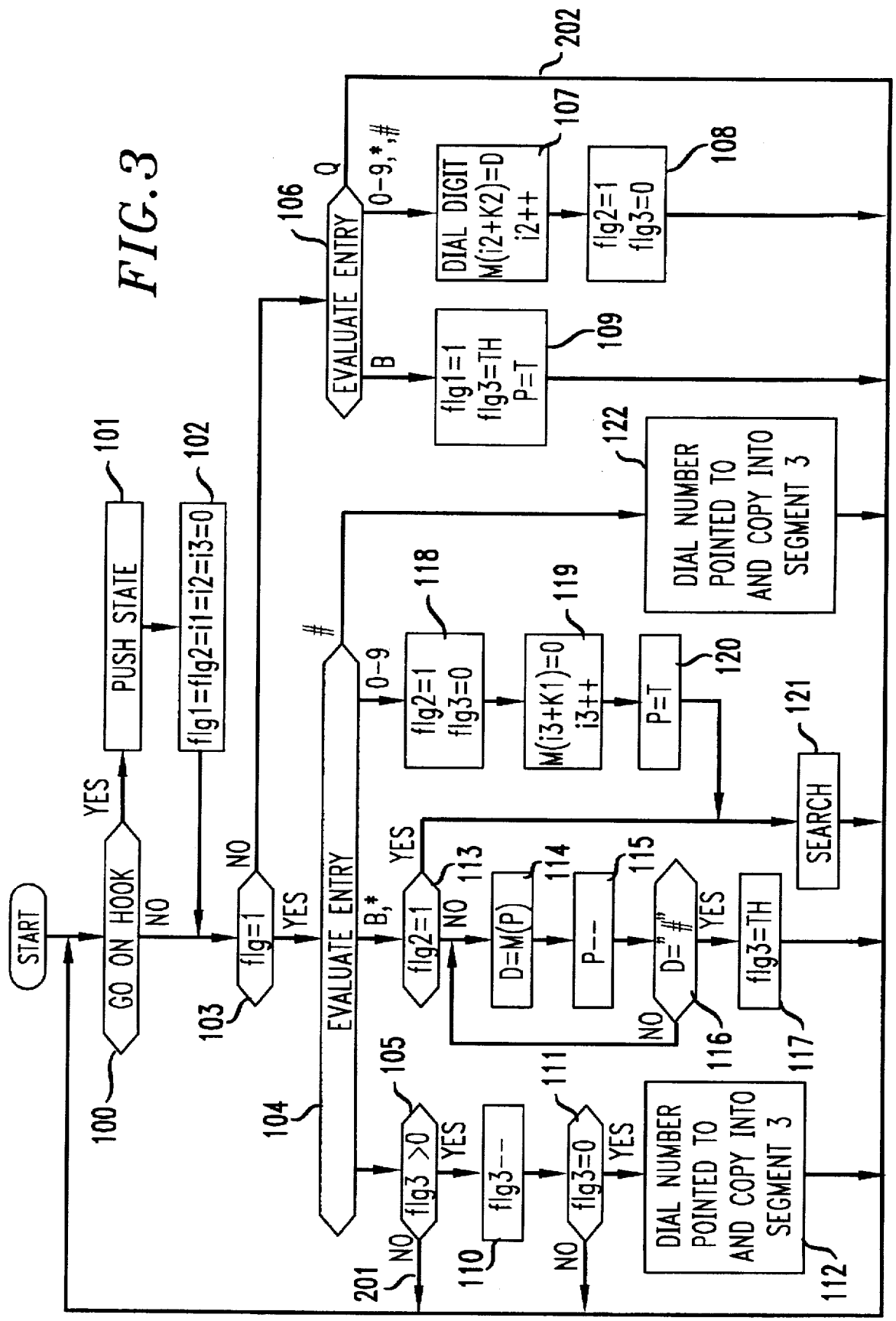
FIG. 3 is a flow chart of the process carried out by the FIG. 1 instrument.

FIG. 3 is a flow chart that implements the operations described by the above table. To start describing the process, it is assumed that the phone is in use, i.e., it is connected to a number that had been dialed out and which had been stored in the third segment of memory 31. Other than being connected and in use, the phone is in a quiescent state. That is, no digits are being dialed, the backup button is not being pressed, and no action is being taken vis-à-vis hook switch 20.

At this state, the process cycles through one of two wait loops. When flg1 is 1, it cycles through decision blocks 100, 103, 104, and 105 before returning to block 100 via line 201. When flg1 is 0, it cycles through blocks 100, 103 and 106, and returns to block 100 via line 202. More specifically, while the telephone is active (in a conversation), block 100 determines that the phone is not being placed in the "on hook" position and passes control to block 103. Block 103 passes control to either block 104 or to block 106, depending on the value of flg1. When flg1=1, control passes to block 104, where it is determined that no entries are being made, and control passes to block 105. Decision block 105 determines that flg3=0 (which always equals 0 during a conversation, as will become apparent below) and passes control to block 100 via line 201. When flg1=0, control passes from block 103 to block 106, which makes a determination identical to the determination in block 104 and passes control back to block 100 via line 202.

Flg3 is a timer flag. It is set to something other than 0 whenever push-button 16 is pressed at the beginning of a dialing sequence. It decrements to 0 after a preselected time as long as no other digits are pressed, and is set to 0 when a digit is pressed. Thus, during a conversation, flg3 is 0 either because it had been set to 0 or because it had been decremented to 0. The preselected time is, of course, related to the value to which flg3 is set.

The next action that naturally is expected to occur is for the phone to go "on hook", i.e. hang up. When that condition is detected by block 100, control passes to block 101 which pushes the last number dialed onto the stack, block 102 resets a number of variables (flg1=0, flg2=0, i2=0, i3=0), and control returns to block 100. Thereafter, the cycling repeats through the wait loop that encompasses blocks 100, 103, 106, and line 202, because the phone is again quiescent and flg1=0 (through the action of block 102). It may be noted that the FIG. 1 system includes a "system reset" which, for the sake of clarity, is not shown. In addition to the resetting done by block 102, the "system reset" sets all memory locations in the aforementioned memory segments of memory 31 to "#", and resets P, T, and i1.

Figure 4:
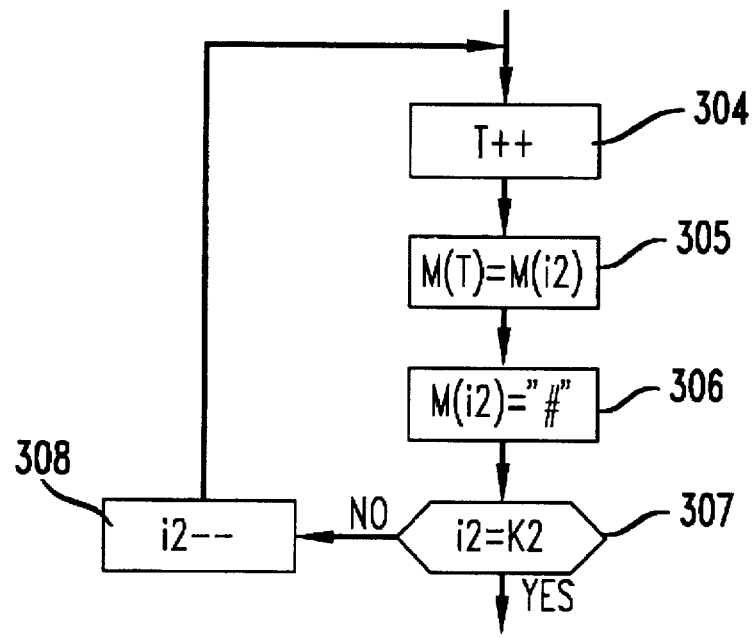
FIG. 4 describes the process of pushing a number onto the stack in memory 31.

Pushing the last number dialed onto the stack is accomplished by copying the last number dialed that is stored in the third segment of memory 31 into the first segment of memory 31 (the stack) in reverse order (to create a LIFO memory). This process is shown in FIG. 4. Block 304 increments the top-of-the-stack pointer T by one, block 305 copies the contents of location i2 into location T, block 306 replaces the contents of location i2 with the digit #, and block 307 determines whether i2=K2. While i2≠K2, control passes to block 308 which decrements i2 by 1 and returns control to block 304. When i2=K2, the process terminates.

Returning to FIG. 3, once the phone is "on hook", the next likely event is that of the user wishing to place a call. The following discussion explains how the dialing process proceeds for the various options, or methods of dialing, that are identified in the table above.

Normal Dialing

When the user employs the phone in the familiar mode of picking up the handset and dialing the desired number, it is expected by the user that the dialed digits will be dialed out as soon as they are pressed. The process of FIG. 3 achieves that. As each entry appears and decision block 106 is reached, control passes from block 106 to block 107 which dials out the entry, D, stores the entry in memory location i2+K2, and increments index i2. Thereafter, block 108 sets flg2 to 1, indicating that digits have been entered by the user, and sets flg3 to 0, indicating that there is no need to have the timer running. From block 108, control returns to block 100 and subsequent digits, if any, are dialed out and stored in the third segment of memory 31.

Presuming the dialed out digits cause the telephone network to connect the telephone instrument of FIG. 1 to the desired party, a conversation ensues. When the telephone is placed back in the "on hook" state, the number stored in segment 3 is transferred to the top of the stack, as described previously. Since index i2 is incremented after the digit is stored, index i2 always points to a location that contains the digit "#". Consequently, pursuant to the flow chart of FIG. 4, the first digit that is stored in segment 1 is the "#" digit.

Re-dialing The Last Number Dialed By Pressing "B"

When the first action taken after the telephone goes "off hook" is B (pressing button 16), block 106 passes control to block 109 which sets flg1 to 1, flg3 to TH, and the pointer P to T. Control is then returned to the wait cycle that includes blocks 100, 103, 104, 105 and line 201. Having set flg3 to TH, block 105 passes control to block 110, which decrements flg3, and thereafter block 111 evaluates the value of flg3. When flg3=0, control passes to block 112 which dials out the number pointed to by P (which is also T), and copies the dialed number into segment 3 of memory 31. Otherwise, control block 111 returns control to block 100.

Figure 5:
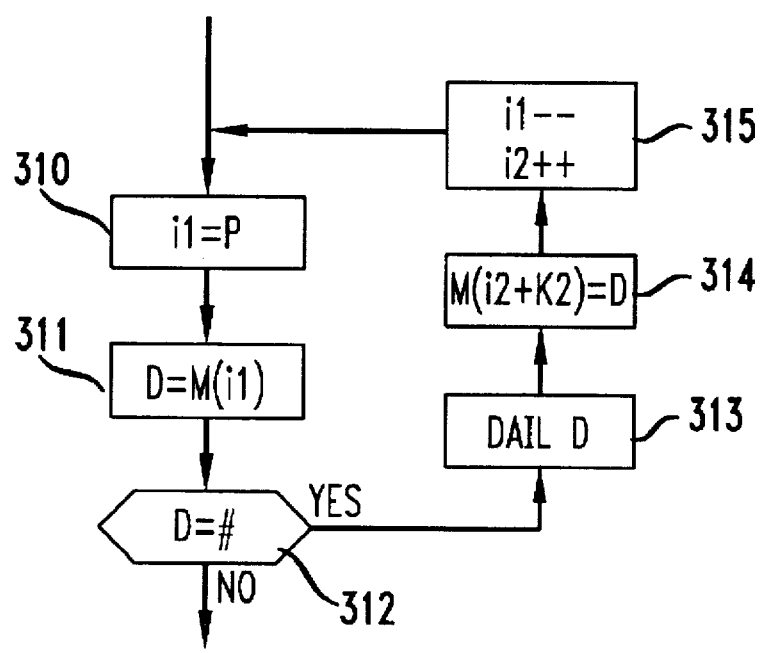
FIG. 5 describes the process of dialing a pointed-to number and copying the dialed number into segment 3 of memory 31.

The process carded out by block 112 is described in greater detail in FIG. 5. Block 310 sets index i1 to P and block 311 reads the contents of memory address i1. Block 312 evaluates the read data, and as long as it is not "#", control passes to block 313 which dials out the read digit, D. Thereafter, control passes to block 314 which stores D in memory locations i2+K2, block 315 increments i2 and decrements i1, and control returns to block 310. When D="#", the process terminates.

Thus, when B is entered, a timer is activated with flg3 being set to TH. When flg3 reaches 0 and block 112 begins its work, P=T points to the first digits of the last number stored in segment 1 of memory 31. This digit is dialed out, followed by other stored digits, up to the digit "#". Concurrently, the dialed digits are stored in the third segment of memory 31.

Dialing Numbers Previous to the Last Number Dialed

Entry of a B followed by another B, or a "*", indicates that the user wishes to simply back up in the stack. Each entry of a B or "*" is a request to back up one additional number in the stack. This is accomplished in the FIG. 3 process with control passing through block 108 to block 113. Block 113 determines whether flg2 is set to 1 (indicating that intervening digits have been pressed). When it is not, which is the case when B is followed by a B or a "*", control passes to blocks 114-116 which back up pointer P in the stack. The backup is effected with block 114 reading the contents of memory location P, block 115 decrementing P, and block 116 determining whether D="#". As long as D is not "#", control returns to block 114. Otherwise, P points to the first digit in the next number in the stack, and control passes to block 117 which resets flg3 to TH, and the process returns to block 100.

Searching for a Previously Dialed Number

At times, the user knows that a particular number had been dialed a number of phone calls ago. The user may know some of the initial digits, but does not remember the other digits. Or simply, the user may choose to have the telephone retrieve and dial the telephone regardless of whether the user remembers the number or not. This requires a search through the stack for the correct number, and such a search is effected by B followed by at least one digit.

When B is entered, and it is followed by a digit (0-9) before the timer flag fgl3 has reached 0, the loop comprising blocks 100, 103, 104, 105, 110, and 111 is interrupted when the following digit is entered, and control passes from block 104 to block 118. This corresponds to the sixth entry in the table above. Block 118 sets flg2 to 1—indicating the arrival of digits, and resets flg3 to 0—turning off the timer. Thereafter, block 119 stores the entered digit, D, in segment 2 of memory 31, in address i3+K1, and increments index i3. Thereafter, block 120 sets index P to T and passes control to block 121 which performs a search. The search is accomplished in accordance with the flow chart of FIG. 6.

Figure 6:
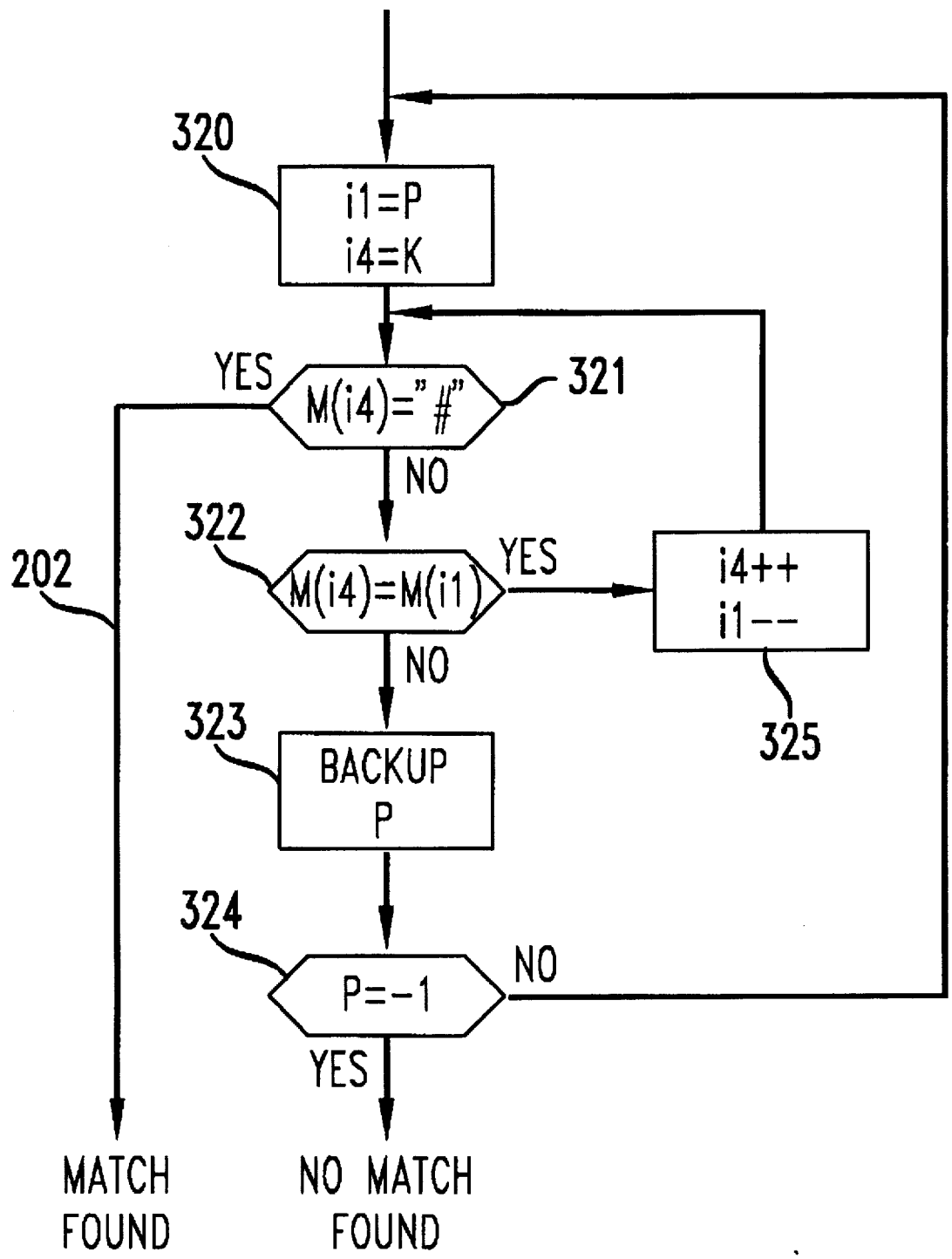
FIG. 6 describes the search process for a number with specified digits.

In FIG. 6, block 320 starts the search by setting index i1 to P and setting index i4 to K1. These are the two search indices. Block 321 then evaluates the value of M(i4). As long as M(i4) is not "#", which would indicate the end of the string of digits stored in segment 2 of memory 31, control passes to block 322 which compares the contents of addresses i1 and i4. If they do not match, it is known immediately that the entire number pointed-to by P is not the one that is being sought and, therefore, block 323 backs up the pointer P to the next previous number in the stack (in a manner that is identical to that of blocks 114-116 in FIG. 3).

The backing up of the pointer can lead to P being equal to −1, which indicates that the entire stack had been searched with negative results. To account for this possibility block 324 looks at the value of P. While P is not −1, control returns to block 320 where i1 is set to the new P value and another search is attempted. If P=−1, an indication is provided that no match has been found in the stack.

When block 322 finds that M(i1)=M(i4), indicating that a match can possibly be found, control passes to block 325 where index i4 is incremented, index i1 is decremented, and control returns to block 321 where, again, the value of M(i4) is questioned.

When a match is found, eventually block 321 will find M(i4)="#". In the case of entering B7, for example, this will occur the second time through the loop consisting of blocks 321, 322, 325. At such a time, control passes to line 202, which indicates that a match has been found. What this translates to, in terms of the user interface, is discussed below. In terms of the process, however, control returns to block 100 and P points to the address of a number in the stack that matches the digit stored in segment 2 of memory 31.

At the point where the search process has identified a number in the stack (and P points to that number), the user has three options (in addition to the always present handing up and restarting):

a) Accept the number found, and request that the number be dialed out. This is done by pressing "#" (e.g., the B7# entry in the table above);

b) Request that another (earlier-dialed) number be found which matches the search string contained in segment 2 of memory 31. This is done by pressing B or "*" (e.g., the B7* entry in the table above); or c) Add another digit to the search string to request a new search, with the augmented string in segment 2 of memory 31. This is done by simply entering another digit (e.g., the B74 entry in the table above).

When the user enters "#", control passes from block 104 to block 122 where the number pointed to by P is dialed out, and the dialed number is stored in segment 3 of memory 31. This block is identical to block 112.

When the user enters B, or "*", control passes from block 104 to block 113 where, since flg=1, control transfers to block 121. Block 121 performs a search, as described above, starting from the current value of P.

When the user enters another digit, control passes from block 104 to block 118, and the process continues as described before; that is, P is reset to T and the search process takes place.

The last entry in the table above has a number of digits that precede B. To illustrate, the digits in the table are "908", which is an area code designation. Indeed, entry of an area code followed by B may be a rather common sequence. It would likely occur when a person dials a number and is then informed that the number is not found in the local dialing area. Prefixing the proper area code, followed by pressing button 16 corrects the problem.

In accordance with the flow chart of FIG. 3, entry of the digits follows the branch that includes blocks 107 and 108. The digits are dialed out and also stored in segment 3 of memory 31. Entering B and nothing more passes control to the branch that includes block 109 and, thereafter (after the timer has expired), to the branch that includes block 112, thereby dialing out the last number dialed.

As demonstrated above, the FIG. 3 process incorporated in the FIG. 1 instrument imparts various highly desirable capabilities. It can search for previously dialed numbers in order, or based on a specific sequence of digits. When a search is completed, it is ready to dial out the identified number in response to the user entering the "#" symbol, which in effect is the "send" button.

There is a small issue of how does the user know what number is being pointed to that would be dialed out when "#" is pressed.

In a telephone instrument like the one depicted in FIG. 1, which includes a display 40, that is not a problem. Included in blocks 112 and 122 or FIG. 3 there would be a module of displaying the number pointed to. In a telephone that includes a single line display, only the pointed to number is shown. In a telephone that includes or a multi-line display, a number of stored numbers are shown, starting with the number pointed to by P. A telephone that does not include a display is more problematic if cost is a major factor. When cost is not a major factor, the display module in blocks 112 and 122 can be substituted with a "text to speech" conversion module that reads and enunciates the number pointed to. The speech conversion module can be incorporated in microprocessor 30 that is coupled to receiver/transmitter 10 of FIG. 1.

Figure 7:
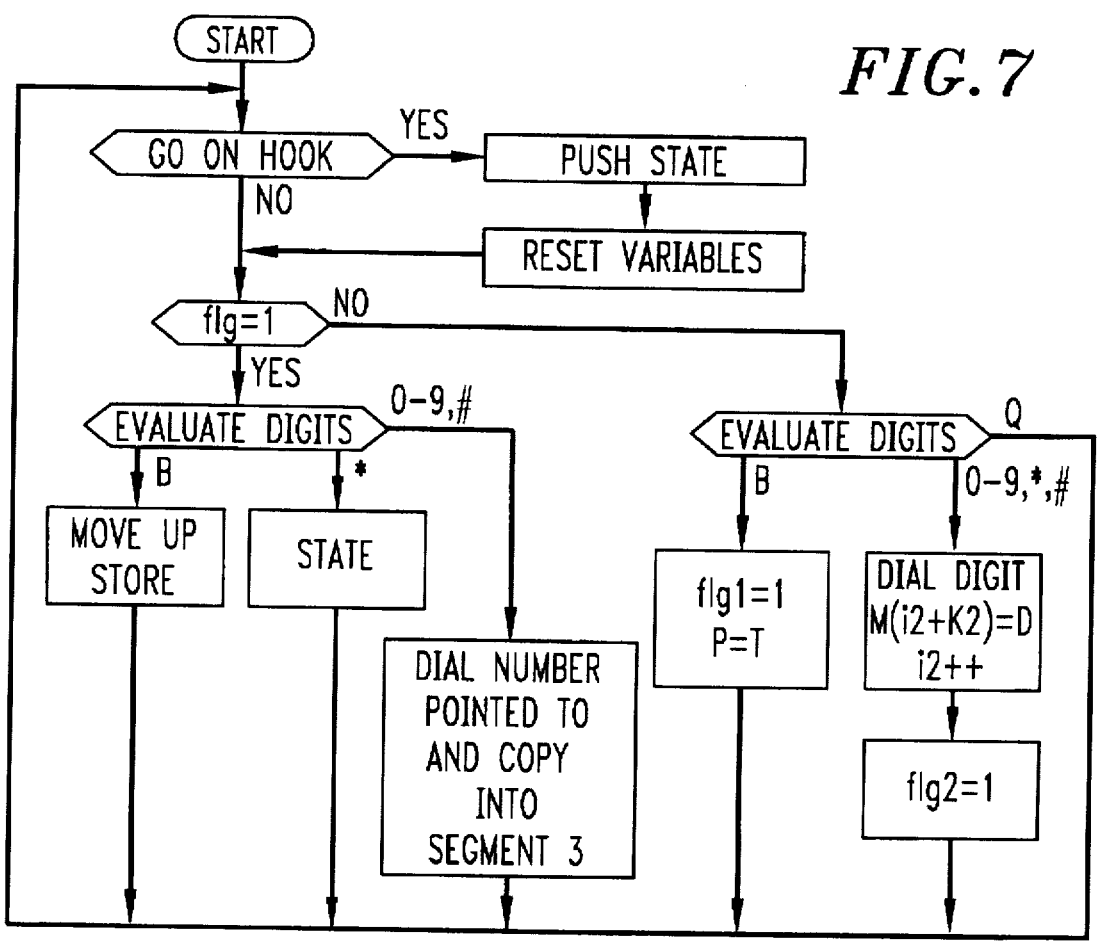
FIG. 7 presents a simplified version of the FIG. 3 flow chart that is well suited for telephone instruments that include a multiline display.

When the telephone instrument includes a multi-line display, there is yet another way to access a number that had been previously dialed: display as many previously dialed numbers as the display will allow, and provide means for the user to select one of the displayed numbers. The search capability of FIG. 3 can be dispensed with, in favor of simply providing a means for moving up and down the stack. The process of FIG. 3 can be easily altered to designate the "*" to move the pointer up the stack, while leaving push button 16 as the means for moving the pointer down the stack. FIG. 7 presents such a simplified version, which is further simplified to eliminate the need for the timer of flg3.

Figure 8:
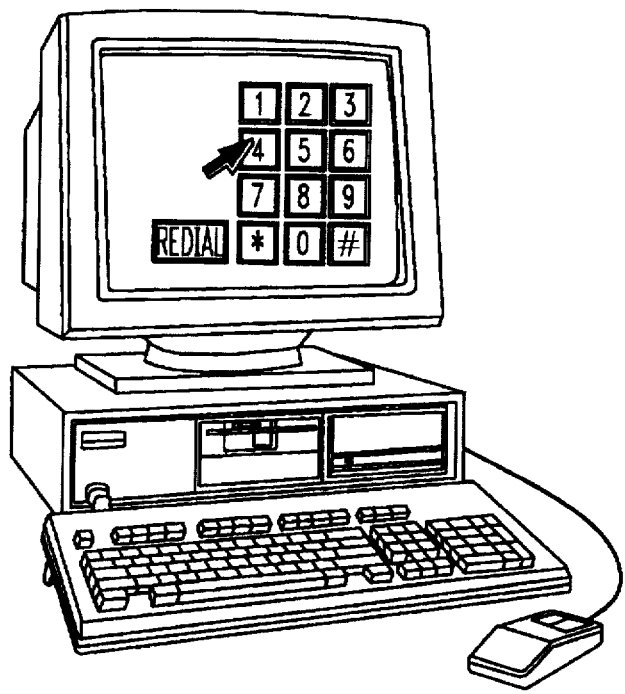
FIG. 8 presents an embodiment with the instrument being embodied in a computer and the interface is a pointer device and a screen.

The above disclosure provides a description of one embodiment that comports with the principles of this invention. Variations are, of course, possible that do not depart from the spirit thereof. For example, the notion of employing a can be extended to eliminate the need to use the "#" button. Also, when the functionality of a telephone instrument is incorporated in the software and hardware arrangement of a personal computer, the principles disclosed herein can be incorporated to offer the benefits described above. The conventional interface of such a PC-implemented telephone instrument is shown in FIG. 8.

The invention claimed is:

1. A telephone instrument including a dial pad having buttons, a button that is dedicated to retrieving a previously dialed number (B button), a memory, a processor arrangement coupled to said dial pad, said B button, and said memory, and further including means for accessing a previously dialed number that is stored in said memory and dialing out the accessed number in response to said button being pressed, the improvement comprising:

means for accessing another number in said memory when said button B is pressed once and pressed again within a prechosen time interval, and means for accessing another number in said memory when said button B is pressed once and one of the buttons on the dial pad is pressed within said prechosen time interval, means for dialing out the number accessed by said means for accessing following the expiration of a preselected time interval after said button B is pressed; and means for dialing out the number accessed by said means for accessing in response to a preselected one of said buttons of said instrument ("send" button) being pressed.

2. The instrument of claim 1 wherein said "send" button is one of the buttons of said dial pad which is marked by other than a digit.

3. The instrument of claim 1 wherein said means for accessing, in response to a designated one of the buttons of said instrument ("repeat" button) being pressed, accesses a number in said memory that corresponds to a previously dialed number that was dialed immediately before another previously dialed number which was accessed in said memory immediately prior to the pressing of said "repeat" button.

4. The instrument of claim 3 where the "repeat" button is the B button.

5. The instrument of claim 3 where the "repeat" button is one of the dial pad buttons that is marked by other than a digit.

6. The instrument of claim 3 further comprising means for informing a user of the number that is accessed when the user operates the instrument to access a number in said memory.

7. The instrument of claim 6 wherein said means for informing is a display coupled to said processor arrangement.

8. The instrument of claim 1 wherein said means for accessing, in response to a user pressing the B button followed by the user pressing a button of said dial pad that is marked by a digit, accesses a most recently dialed number stored in said memory that begins with the digit that corresponds to the digit marked on the dial pad button pressed by the user following the pressing of the B button.

9. The instrument of claim 8 wherein said means for accessing, in response to a user pressing the B button followed by the user pressing a button of said dial pad that is marked by a digit, and followed still by the user pressing a preselected button of said instrument ("repeat" button), accesses a next to most recently dialed number stored in said memory that begins with the digit that corresponds to the digit marked on the dial pad pressed by the user following the pressing of the B button.

10. The instrument of claim 1 wherein said means for accessing, in response to a user pressing the B button followed by the user pressing a plurality of buttons of said dial pad that are marked by a digit, accesses a most recently dialed number stored in said memory that begins with the digit sequence that corresponds to the digits marked on the sequence of dial pad buttons pressed by the user following the pressing of the B button.

11. The instrument of claim 1, further including a display screen, wherein said dial pad and said B button are designated, bounded, areas on the screen, forming screen buttons, and the instrument further comprises means for effectively pressing said screen buttons.

* * * * *